Aug. 2, 1938.  W. RAHR  2,125,749
CORN POPPER
Filed Sept. 23, 1936

INVENTOR
William Rahr,
BY
Wheeler, Wheeler and Wheeler
ATTORNEYS

Patented Aug. 2, 1938

2,125,749

UNITED STATES PATENT OFFICE 2,125,749

CORN POPPER

William Rahr, Two Rivers, Wis., assignor to Carlier & Rahr, Inc., Manitowoc, Wis., a corporation of Wisconsin Application September 23, 1936, Serial No. 102,097

9 Claims. (Cl. 53—4)

This invention relates to improvements in corn poppers.

One of the primary objects of the invention is to provide a novel and improved type of corn popper in which an imperforate pan adapted to hold the corn and such liquid flavoring material as butter or lard, is surmounted by a detachable dome shaped screen cover, the pan and cover preferably being independently usable.

Another important object of the invention relates to the arrangement whereby the resilience of the cover itself is used as a means for retaining its latch element in engagement with the complementary element of the pan pending release by the operator.

Other objects of the invention relate to the provision of a releasable hinge connection between the pan and the screen cloth cover which, although releasable, will nevertheless maintain its engagement when the pan is inverted to discharge its contents; to the provision of a novel and improved type of handle; and to the provision of a novel and improved toy which, in the alternative embodiment of the invention, may be mounted on the handle to move during the operation of the device.

In the drawing.

Like parts are identified by the same reference characters throughout the several views.

Figure 1:
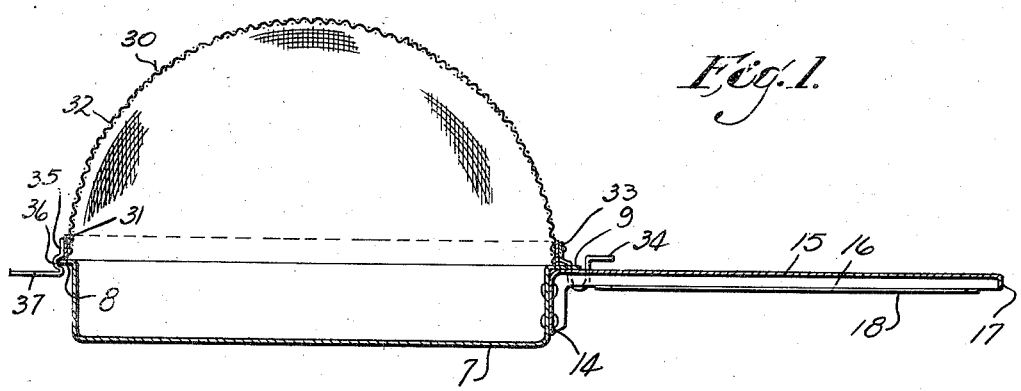
Figure 1 is a view in longitudinal section through a device embodying the invention.
Figure 2:
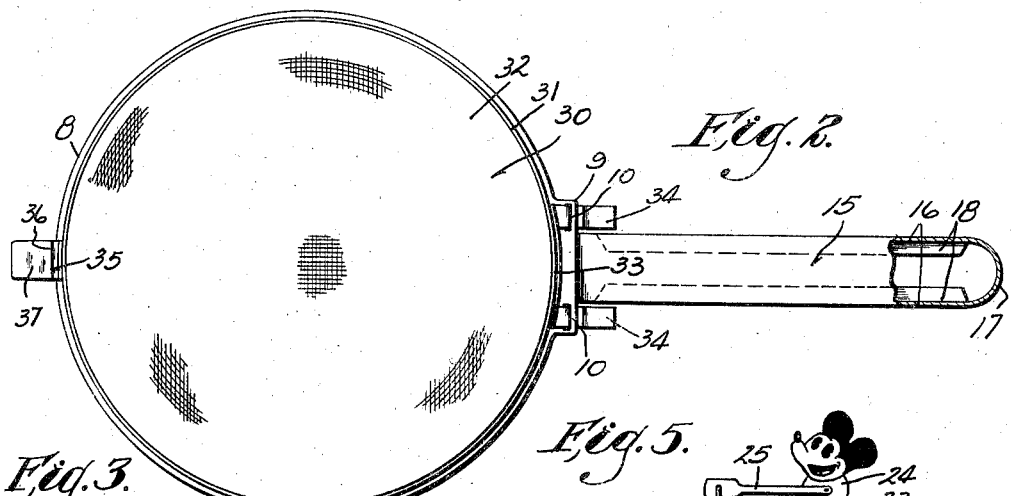
Figure 2 is a plane view of the device shown in Fig. 1.

The pan 7 may be made of sheet metal or the like for lightness if desired, and it is of generally conventional form with the exception that its marginal flange 8 is extended at 9 and provided with slots 10 to facilitate the detachable hinged connection of the cover hereinafter to be described.

The handle may conveniently comprise an elongated channel member having a short arm portion 14 riveted to the side wall of the pan immediately beneath the central portion of the flange 9. The elongated portion 15 which comprises the handle proper, projects horizontally from the pan. Side flanges 16 are continuous throughout the shorter leg 14 and the longer leg 15 of the handle, and are integrally joined by a curved end flange 17.

There may, if desired, be inward extension flanges 18 to finish off the lower margins of flange 16 and to prevent the operator's hand from being rendered sensitive by contact with any raw edges of the metal.

Figure 5:
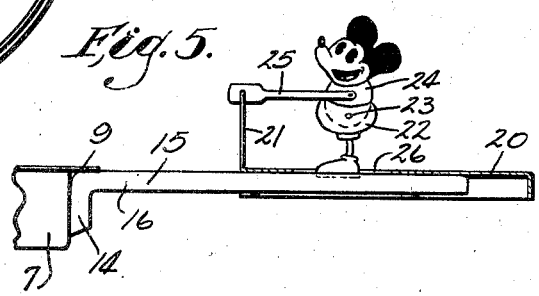
Figure 5 is a fragmentary detail view in side elevation showing a modified embodiment of the handle portion of the device.
Figure 6:
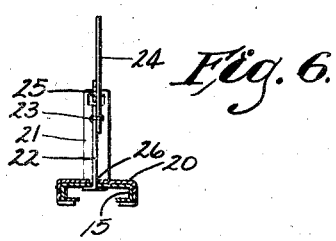
Figure 6 is a view in transverse section through the handle shown in Fig. 5.

In the form of the device shown in Figs. 5 and 6 I provide an inner handle 15 identical to that already described, upon which I may mount a supplemental handle grip portion 20 which is longitudinally slidable upon handle portion 15. I fix on an intermediate portion of the fixed handle element 15 a standard shaped in silhouette to represent the lower part of the body of any appropriate figure. The standard is designated by reference character 22. To this I pivot at 23 the appropriate upper body portion 24, the arm or some other part of which is extended as at 25 to engage pivotally an upturned extremity 21 on the slidable member 20. When the handle grip portion 20 is used to reciprocate the proper pan over a fire, the figure on the handle is caused to have articulated movement in a realistic manner. The handle grip portion 20 is slotted at 26 to pass the standard 22, and the length of the slot limits the possible relative movement between its parts to assure that the movement of the grip will be transmitted in the intended manner to the pan to reciprocate it upon the stove.

Figure 4:
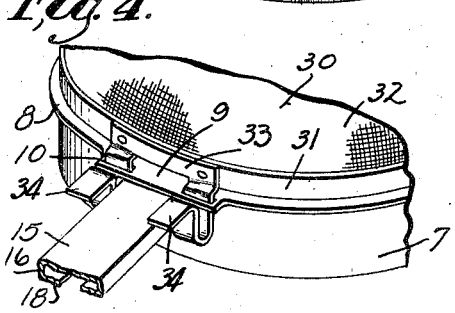
Figure 4 is a fragmentary view in perspective showing the hinge mechanism.

It will be noted that the pan is extremely shallow, this being desirable for the purposes of my invention. It is enclosed by a dome shaped cover generically designated by reference character 30, the cover comprising a sheet metal band at 31 marginally secured to a hemisphercal dome 32 of screen cloth. To the band I rivet at 33 a fitting shown in detail in Fig. 4 which provides legs 34 spaced at either side of the handle portion 15. The legs are extended through the slots 10 and thence turned back upon themselves, and thence bent rearwardly along the handle.

These legs provide a hinged connection between the cover 30 and the pan, whereby the cover may be swung pivotally to expose the contents of the pan. The pan may be inverted and the cover will swing to a position at right angles to that in which it is illustrated, or even slightly beyond, without becoming disengaged from the pan. This permits the contents to be readily dumped into a suitable dish when the popping operation is complete. At the same time the connection illustrated is such that by suitable manipulation the legs may be withdrawn from the slots 10 to completely disengage the cover from the pan. It may then be used as a strainer or otherwise, and the pan may likewise be used separately to perform the ordinary functions of a frying pan.

Figure 3:
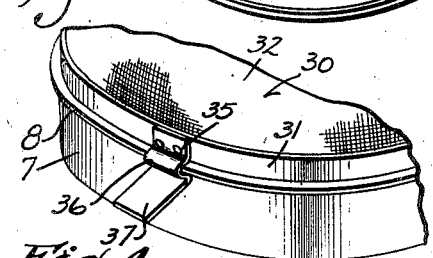
Figure 3 is a fragmentary detail view in perspective showing the latch mechanism.

To prevent the cover from hinged movement during the popping of corn, I provide a latch 35 secured to the band portion 31 of the cover as shown in Fig. 3, and bent first outwardly and then inwardly and then outwardly again, to provide a channel 36 engageable over the margin of the flange 8 of the pan. Contrary to usual practice in the making of such latches, the member 36 is not resiliently yieldable under normal use, but is relatively rigid. The resilience which permits its engagement with the pan and its detachment therefrom is afforded by the band 31 of the cover 10 itself. This band, being circular, may readily be slightly distorted sufficiently to engage or disengage the latch element. The extended end 37 of the latch element is used as a handle in manipulating it.

The fact that the pan is shallow renders its contents more readily visible than would otherwise be the case, and the device has proved to be particularly attractive because of the fact that the popping of the corn hurls the popped kernels upwardly into the dome shaped screen cloth container, through the mesh of which the movements of the corn are clearly shown. Thus, although the device is simpler and less expensive than most corn popping devices, and is adapted to pop the corn in grease (which is not true of many poppers), it does a better job of corn popping and is more desirable from the standpoint of the operator than many other structures. For young operators the special form of handle suggested in Figs. 5 and 6 is also very attractive. To more mature operators the separate utility of the pan 7 and the cover 30 is a feature of value.

I claim:

1. A corn popper comprising the combination with a pan, of a flexible cover therefor, means providing a hinged connection between the cover and the pan at one side of the pan, and a latch at the other side of the pan comprising the complementary parts of the cover and pan, each of which is relatively rigid, said parts being engageable and disengageable upon the flexing of the cover.

2. A corn popper comprising the combination with a pan, of a flexible cover therefor, means providing a hinged connection between the cover and the pan at one side of the pan, and a latch at the other side of the pan comprising the complementary parts of the cover and pan, each of which is relatively rigid, said parts being engageable and disengageable upon the flexing of the cover, said cover comprising an annular band adjacent the pan and a closure of screen cloth marginally connected therewith.

3. In a corn popper, the combination with a pan having a marginal flange provided at one side of the pan with a lateral extension having a slot, a dome shaped cover comprising an annular flange and a screen cloth closure marginally secured to the flange, an arm connected with said flange and extending through said slot and comprising a hinged connection between one side of said cover and said pan, and a relatively rigid arm at the opposite side of the cover secured to the band portion thereof and having a channel engageable over the flange of the pan, said last mentioned arm being engageable and disengageable with respect to said flange upon the flexing of said band.

4. A corn popper comprising the combination with a flanged pan provided with a handle, of a cover comprising a band and a screen cloth closure marginally secured to the band, a hinge fitting having arms in pivotal connection with the flange at either side of the handle of the pan, and a latch connected with said band at a point remote from said hinge fitting and having a portion engageable with and disengageable from the flange of the pan upon the flexing of the band.

5. In a corn popper, the combination with a container and a handle element fixed thereto, of an extension handle slidable upon said handle end, and a figure having component parts connected with each other and independently connected respectively with the handle element and the handle extension, whereby to produce relative movement between the said parts of said figure upon the use of the handle extension to reciprocate the pan in popping corn.

6. A corn popper comprising the combination with a container having a handle element and a handle extension slidable thereon, of a figure having a portion mounted on the handle element and a second portion in movable connection with the first, and means including a link connecting said second portion with the handle extension, whereby said first and second portions of said figure will be caused to move with respect to each other upon the movement of the handle extension with respect to the handle in the manipulation of the container incident to the popping of corn.

7. In a corn popper, the combination with a pan member and a cover member, of means providing detachably for the hinged connection of the pan member with the cover member, said means including an apertured flange projecting laterally from the margin of one of said members and at least one hook-shaped leg connected marginally with the other member and extending through a slot of the flange to provide a freely releasable hinged connection therewith.

8. A corn popper comprising the combination with a pan provided with a flange, of a handle connected with the pan and projecting laterally therefrom immediately beneath the flange, the flange being slotted at each side of the handle, an inverted strainer comprising a cover for the pan, and means releasably hinging the strainer to the pan comprising spaced hook-shaped elements freely receivable into and removable through said slots and engageable about said flange for hinged movement of the strainer respecting the pan.

9. In a corn popper, the combination of a pan provided with a handle, of an inverted strainer comprising a cover for said pan, and a hinge between said pan and cover providing a detachably releasable hinged connection therebetween, said hinge including parts respectively fixed to said pan and cover, one of said parts comprising integrally a portion with which the other of said parts is interlocked for normal hinge movement and for withdrawal upon the adjustment of said parts to one extreme of said movement, whereby the cover may be swung to and from closed position on the pan during its use as a corn popper and may be separated therefrom for independent use.

WILLIAM RAHR.